(12) United States Patent
Podoler

(10) Patent No.: US 10,901,879 B2
(45) Date of Patent: Jan. 26, 2021

(54) METHOD AND APPARATUS FOR AUTOMATIC TESTING OF WEB PAGES

(71) Applicant: TestCraft Technologies LTD., Tel Aviv-Jaffa (IL)

(72) Inventor: Yarin Podoler, Tel Aviv (IL)

(73) Assignee: TESTCRAFT TECHNOLOGIES LTD., Tel Aviv-Jaffa (IL)

( * ) Notice: Subject to any disclaimer, the term of this patent is extended or adjusted under 35 U.S.C. 154(b) by 308 days.

(21) Appl. No.: 15/969,757

(22) Filed: May 2, 2018

(65) Prior Publication Data

US 2019/0340114 A1 Nov. 7, 2019

(51) Int. Cl.
G06F 11/00 (2006.01)
G06F 11/36 (2006.01)
G06F 16/958 (2019.01)

(52) U.S. Cl.
CPC ...... *G06F 11/3688* (2013.01); *G06F 11/3684* (2013.01); *G06F 16/986* (2019.01)

(58) Field of Classification Search
CPC .......... G06F 17/3033; G06F 17/30336; G06F 16/958; G06F 3/04842
See application file for complete search history.

(56) References Cited

U.S. PATENT DOCUMENTS

| | | | | |
|---|---|---|---|---|
| 5,855,015 A * | 12/1998 | Shoham | ................. | G06F 16/954 715/205 |
| 9,411,782 B2 * | 8/2016 | Harris | .................... | G06F 16/958 |
| 9,600,401 B1 * | 3/2017 | Haischt | ............... | G06F 11/3664 |
| 10,489,375 B1 * | 11/2019 | McClintock | ........ | G06F 16/2365 |
| 10,552,299 B1 * | 2/2020 | Surace | .................. | G06F 40/221 |
| 2002/0065842 A1 * | 5/2002 | Takagi | ................ | G06F 16/9577 709/217 |
| 2003/0020752 A1 * | 1/2003 | Santiago | ................. | G06F 9/451 715/764 |

(Continued)

FOREIGN PATENT DOCUMENTS

EP 2105837 A2 9/2009

OTHER PUBLICATIONS

International Patent Application No. PCT/IL2019/050436, International Search Report and Written Opinion dated Jul. 23, 2019, 9 pages.

*Primary Examiner* — Bryce P Bonzo
*Assistant Examiner* — Jeison C Arcos
(74) *Attorney, Agent, or Firm* — Fredrikson & Byron, P.A.

(57) ABSTRACT

A computer-implemented method, apparatus and computer program product, the method comprising: obtaining attribute weights associated with element attributes in a web page comprising elements, in regard of a specific element to be operated upon, a first margin, and a second margin; based on the attribute weights, determining a probability for each element in the web page to be the specific element; determining a first threshold indicating a difference between probabilities of two elements having the highest probabilities; determining a second threshold indicating a difference between a probability of an element having the highest probability and one; based on the first threshold, second threshold, first margin and second margin, determining whether the element having the highest probability is the specific element; and subject to the specific element being identified, performing an action upon the specific element.

18 Claims, 5 Drawing Sheets

(56) References Cited

U.S. PATENT DOCUMENTS

| | | | |
|---|---|---|---|
| 2009/0100345 A1* | 4/2009 | Miller | H04L 67/42 |
| | | | 715/738 |
| 2009/0125495 A1* | 5/2009 | Zhang | G06F 16/8373 |
| 2009/0300056 A1* | 12/2009 | Fu | G06F 16/8373 |
| 2012/0290920 A1* | 11/2012 | Crossley | G06F 11/3664 |
| | | | 715/234 |
| 2013/0033523 A1* | 2/2013 | Stovicek | G06F 40/197 |
| | | | 345/649 |
| 2013/0041653 A1* | 2/2013 | Tseng | G06F 16/90324 |
| | | | 704/9 |
| 2013/0054622 A1* | 2/2013 | Karmarkar | G06F 16/951 |
| | | | 707/749 |
| 2013/0117658 A1* | 5/2013 | Fidler | G06F 16/30 |
| | | | 715/234 |
| 2013/0227392 A1* | 8/2013 | Zhong | G06F 40/103 |
| | | | 715/234 |
| 2014/0136944 A1* | 5/2014 | Harris | G06F 40/194 |
| | | | 715/234 |
| 2014/0172871 A1* | 6/2014 | Brayman | G06F 16/2272 |
| | | | 707/741 |
| 2016/0239162 A1* | 8/2016 | Sivasubramanian | |
| | | | G06F 11/3604 |
| 2016/0259773 A1* | 9/2016 | Jadhav | G06F 3/0484 |
| 2017/0090734 A1* | 3/2017 | Fitzpatrick | G06F 40/106 |
| 2017/0192882 A1* | 7/2017 | Bhagavathiammal | |
| | | | G06F 16/986 |
| 2019/0018758 A1* | 1/2019 | Stern | G06F 11/3608 |
| 2019/0042397 A1* | 2/2019 | Vignesh R | G06F 11/3688 |
| 2019/0065562 A1* | 2/2019 | Kumar | G06F 16/256 |

* cited by examiner

METHOD AND APPARATUS FOR AUTOMATIC TESTING OF WEB PAGES

TECHNICAL FIELD

The present disclosure relates to testing in general, and to a method and apparatus for testing web pages, in particular.

BACKGROUND

Computerized devices and applications control almost every aspect of our life—from writing documents to controlling traffic lights. However, computer applications, including web pages are bug-prone, and thus require a testing phase in which the bugs should be discovered. The testing phase is considered one of the most difficult tasks in designing a computerized device, or a computer application or even a simple web page.

Of particular interest are automated programs which are used for web pages testing purposes. Web pages typically comprise one or more elements, such as text boxes, buttons, hyperlinks, static elements, and others. Such automated programs simulate the operation of the web pages by a human, in a multiplicity of scenarios, inputs, or the like. The programs may use scripts or are otherwise provided with instructions on how to test the web page, for example which element on the page is to be operated upon, what action to perform, and optionally how to verify the result.

BRIEF SUMMARY

One exemplary embodiment of the disclosed subject matter is a computer-implemented method performed by a computerized device, comprising: obtaining attribute weights associated with element attributes in a web page comprising elements, in regard of a specific element to be operated upon, a first margin, and a second margin; based on the attribute weights, determining a probability for each element in the web page to be the specific element; determining a first threshold indicating a difference between probabilities of two elements having the highest probabilities; determining a second threshold indicating a difference between a probability of an element having the highest probability and one; based on the first threshold, second threshold, first margin and second margin, determining whether the element having the highest probability is the specific element; and subject to the specific element being identified, performing an action upon the specific element. The method can further comprise: subject to the specific element not being identified: prompting a user to identify the specific element; and performing the action upon the specific element. Within the method, if the specific element cannot be identified, prompting the user optionally includes indicating the element having the highest probability and an element having the second highest priority. Within the method, if the specific element cannot be found, prompting the user optionally includes indicating the element having the highest probability. The method can further comprise updating the attribute weights in accordance with the specific element as identified by the user. The method can further comprise determining the attribute weights, comprising: obtaining from an HTML description elements of the web page and attributes of the elements; determining the attribute weights such that a difference between a probability of the specific element and a probability of an element having the second highest probability is maximal. Within the method, determining whether the element having the highest probability is the specific element optionally comprises: subject to the second threshold being zero, determining that the specific element is the element having the highest probability; subject to the second threshold being larger than zero and smaller than the second margin, and the first threshold being larger than the first margin, determining that the specific element is the element having the highest probability; subject to the second threshold being larger than zero and smaller than the second margin, and the first threshold being smaller or equal to the first margin, determining that the specific element cannot be identified; and subject to the second threshold being larger or equal to the second margin, determining that the specific element cannot be found.

Another exemplary embodiment of the disclosed subject matter is a computer-implemented method performed by a computerized device, comprising: obtain attribute weights associated with element attributes in a web page comprising elements, in regard of a specific element to be operated upon; based on the attribute weights, determine a probability for each element in the web page to be the specific element; determine whether the element having the highest probability is the specific element; subject to the specific element being identified, perform an action upon the specific element; and subject to the specific element not being identified: prompt a user to identify the specific element; receive an indication to the specific element from the user; and perform the action upon the specific element. Within the method, if the specific element cannot be identified, prompting the user optionally includes indicating the element having the highest probability and an element having the second highest priority. Within the method, if the specific element cannot be found, prompting the user optionally includes indicating the element having the highest probability. The method can further comprise updating the attribute weights in accordance with the specific element as identified by the user.

Yet another exemplary embodiment of the disclosed subject matter is an apparatus having a processor, the processor being adapted to perform the steps of: obtaining attribute weights associated with element attributes in a web page comprising elements, in regard of a specific element to be operated upon, a first margin, and a second margin; based on the attribute weights, determining a probability for each element in the web page to be the specific element; determining a first threshold indicating a difference between probabilities of two elements having the highest probabilities; determining a second threshold indicating a difference between a probability of an element having the highest probability and one; based on the first threshold, second threshold, first margin and second margin, determining whether the element having the highest probability is the specific element; and subject to the specific element being identified, performing an action upon the specific element. Within the apparatus, the processor is optionally further configured to: subject to the specific element not being identified: prompt a user to identify the specific element; and perform the action upon the specific element. Within the apparatus, prompting the user optionally includes indicating the element having the highest probability and an element having the second highest priority. Within the apparatus, prompting the user optionally includes indicating the element having the highest probability. Within the apparatus, subject to the specific element not being identified, the processor is optionally further configured to update the attribute weights in accordance with the specific element as identified by the user. Within the apparatus, the processor is optionally further configured to determine the attribute weights, comprising: obtaining from an HTML, description elements of the web page and attributes of the elements; determining the attribute weights such that a difference between a probability of the specific element and a probability of an element having the second highest probability is maximal. Within the apparatus, determining whether the element having the highest probability is the specific element optionally comprises: subject to the second threshold being zero, determining that the specific element is the element having the highest probability; subject to the second threshold being larger than zero and smaller than the second margin, and the first threshold being larger than the first margin, determining that the specific element is the element having the highest probability; subject to the second threshold being larger than zero and smaller than the second margin, and the first threshold being smaller or equal to the first margin, determining that the specific element cannot be identified; and subject to the second threshold being larger or equal to the second margin, determining that the specific element cannot be found.

Yet another exemplary embodiment of the disclosed subject matter is a computer program product comprising: a non-transitory computer readable medium; a first program instruction for obtaining attribute weights associated with element attributes in a web page comprising elements, in regard of a specific element to be operated upon, a first margin, and a second margin; a second program instruction for determining a probability for each element in the web page to be the specific element, based on the attribute weights; a third program instruction for determining a first threshold indicating a difference between probabilities of two elements having the highest probabilities; a fourth program instruction for determining a second threshold indicating a difference between a probability of an element having the highest probability and one; a fifth program instruction for determining whether the element having the highest probability is the specific element, based on the first threshold, second threshold, first margin and second margin; and a sixth fifth program instruction for performing an action upon the specific element subject to the specific element being identified, wherein said first, second, third, fourth fifth and sixth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
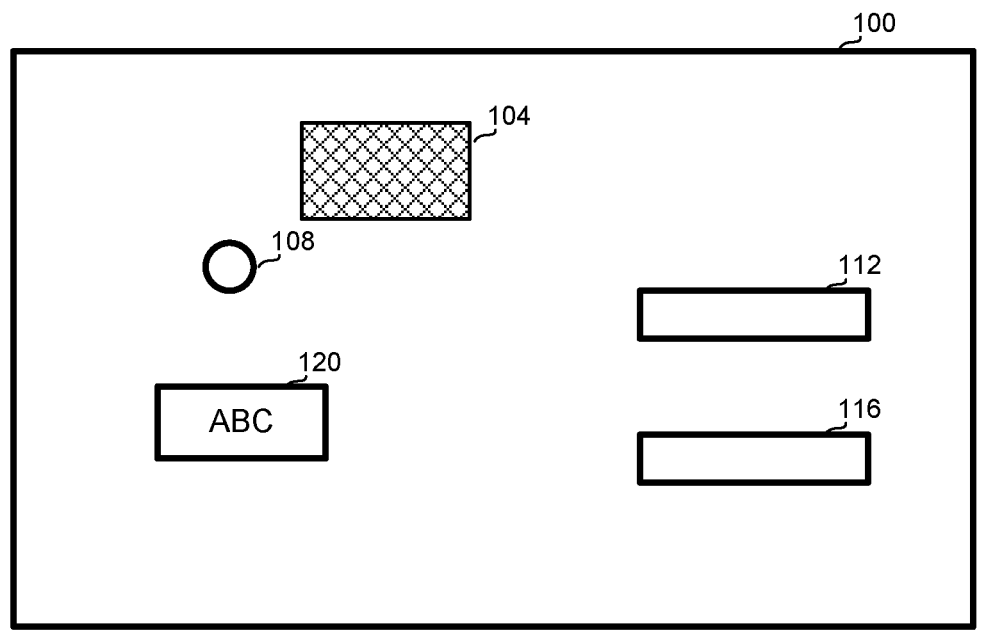
FIG. 1A is a schematic illustration of a web page.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block or blocks of block diagrams.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to test the functionality of web pages, by simulating operations taken by a human user of the web page in a multiplicity of scenarios, entering various inputs, or the like. A human user or a simulation thereof, operates the web page using various controls, also referred to as elements, of the web pages, for example enters text, clicks on buttons, follows hyperlinks, marks checkboxes, toggles, or the like. The behavior can then be validated, for example by checking entered text, making visual comparisons, or the like.

Thus, web pages' functional test scenarios usually comprise sequences of one or more operations, wherein a sequence starts with identifying an element, also referred to as control, to be operated upon, and continues by performing one or more operations with the element.

Web applications today are generally built using HTML technology. Functional test automation for web applications relies heavily on identification of a single control, also referred to as a specific element, in order to take a specific user action, such as click, enter input, toggle, or the like, or to validate the behavior, for example check text, compare visual appearance, or the like.

Multiple techniques have been designed for simulating operation of a web page. Most techniques use one or more locators, also referred to as attributes of the elements, such as a location, an ID, an xPath, a color, or the like to identify elements. During test development, the attributes of the element are noted as a formula-like indicating the attributes and the required values thereof. In runtime, during testing, the formula is applied, the specific element is sought for and if found, is operated upon. However, elements are highly likely to change during development, for example their technical attributes such as shape may change, they may be moved around the page, removed, their ID may change, or the like. Thus, any script or program designed to locate an element by comparing attribute values is subject to fail upon a change in the used attributes. Thus, for example, if an element to be identified by its location is moved, then the element will not be found. In cases in which the element is removed, the test may not be performed and thus not fail, a situation referred to as false positive. In other situations, an element may exist but may not be found due to a changed attribute, which may be referred to as false negative.

Another technical problem relates to the incompatibility of tests between different platforms, due to changes in attributes such as locations, which stem from the different displays used. Thus, tests designed for a web page as displayed on one platform cannot be used as is for a different platform, and involvement of a test developer may be required for adjusting the test, thus incurring time and labor costs.

One technical solution comprises using probability for identifying an element within the web page, wherein the element is most likely to be the specific element upon which an action is to be performed.

During test development, a formula is generated for associating each element with a probability, based on the differences between the attribute values of the element, and the corresponding values of the attribute of the specific element. Thus, the specific element is assigned a probability of 1, and elements that are closer to it in the attribute space are assigned higher probabilities than farther elements. Each attribute is assigned a weight, wherein the weights are determined so as to maximize the probability difference between the specific element and the element having the second highest probability.

In runtime, when it is required to identify the specific element from the elements on a web page, a probability is assigned to each element in the web page, using the weights determined during the test development stage, and the distances between the attribute values of the element and the corresponding attribute values of the specific element. Analysis is then performed, taking into account the probability of the element having the highest probability, and the probability difference between the two highest probability elements.

One technical effect of the disclosure thus relates to the highest probability element: if its probability is close beyond a threshold to one, the element is highly likely to indeed be the specific element.

Another technical effect of the disclosure relates to the reducing confusion between the two elements having the highest probability, thus making the identifying the specific element with higher certainty.

Figure 1B:
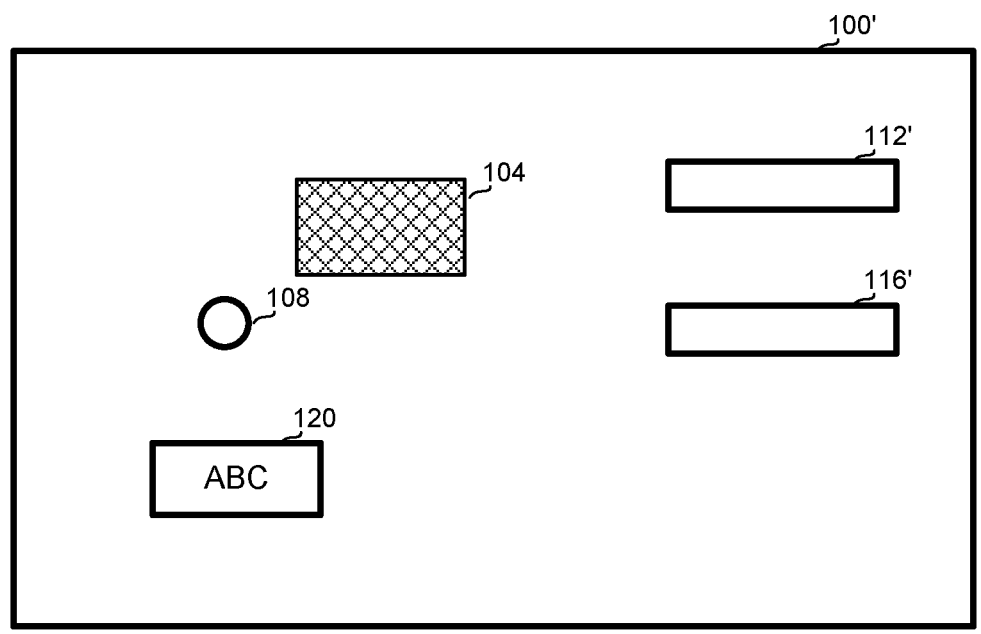
FIG. 1B is a schematic illustration of the web page of FIG. 1A, after a change has been made.

Referring now to FIGS. 1A and 1B, showing web page illustrations demonstrating the need for identifying a changed element. FIG. 1A is an illustration of a web page 100, comprising a bitmap 104, a button 108, a static text 120, and text boxes 112 and 116. A certain test may require entering text into text box 112.

FIG. 1B illustrates a slightly different version of the same page, denoted 100'. Page 100' comprises bitmap 104, button 108, and static text 120 as in page 100, and text boxes 112' and 116' which are at an offset relatively to text boxes 112 and 116 of page 100. If text box 112 is to be identified in accordance with its location, an automated test may erroneously identify text box 116' as the required element, since it is located in page 100' in the same location as text box 112 on page 100. In other situations, for example if the IDs of text boxes 112 and 112' are different, no element will be identified at all.

Figure 2A:
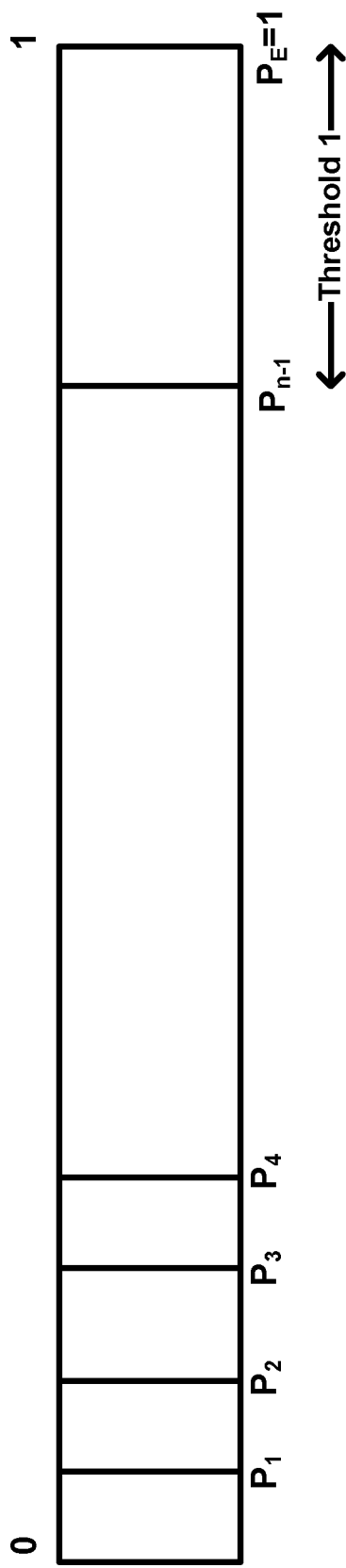
FIG. 2A is an illustration of elements' probabilities during test development time, in accordance with some exemplary embodiments of the disclosed subject matter.
Figure 3A:
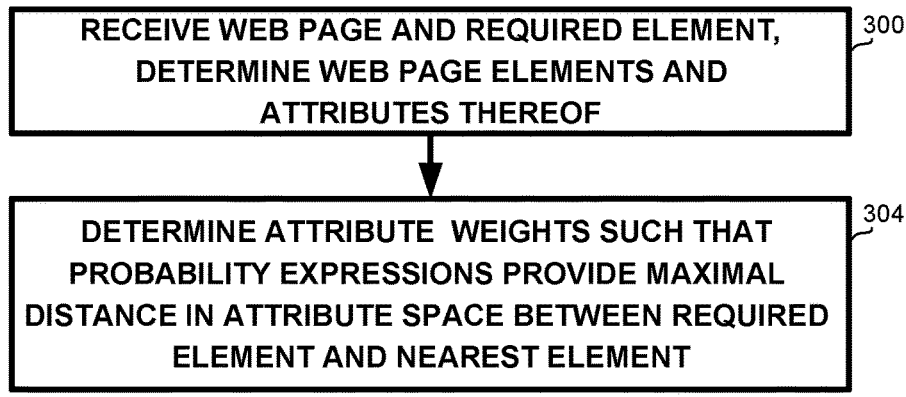
FIG. 3A is a generalized flowchart of a method for associating weights with attributes, in accordance with some embodiments of the disclosure.

Referring now to FIG. 2A demonstrating the probabilities of elements to be the specific element in test development time, and to FIG. 3A, showing a generalized flowchart of a method for associating weights with attributes, in accordance with some embodiments of the disclosure.

The method may be performed at test development time, However, it may also be performed at runtime if the specific element is not detected, wherein subject to the user indicating the specific element, the weights may be re-calculated. It will be appreciated that during re-calculation, a different algorithm may be used, for example an algorithm which receives the previous weights as input and attempts to make minor enhancements rather than start over.

On step 300, a web page description may be obtained, for example in Hypertext Markup Language (HTML) and an indication to the specific element it is required to identify during a test. The web page elements and attributes thereof are then determined from the HTML. The elements are relevant elements of the web page description as received, and the attributes are the relevant attributes of the specific element as appear in the web page description as received. At an initial stage, the relevant attributes may be all attributes of the elements of the web page. The elements may be indicated as $\{E_1, E_2, \ldots, E_k\}$ wherein k is the number of elements, and the attributes of an element may be indicated as $\{EA_1, EA_2, \ldots, EA_n\}$ wherein n is the number of attributes of the element. The attribute values of element i are $\{E_iA_1, E_iA_2, \ldots, E_iA_n\}$, and the attribute values of the specific element may be indicated as $\{E_sA_1, E_sA_2, \ldots, E_sA_m\}$, wherein m is the number of attributes of the specific element.

Each attribute is associated with a distance function d, which may be normalized to a number between 0 and 1, wherein 1 represents equality in the attribute value.

When all attributes have identical weights, the probability of each element i to be the specific element may be described as $$P_i = \left(\sum_{j=1}^{m} d(EiAj, EsAj)\right) * \frac{1}{m}.$$

The probability of the specific element itself is thus 1. It will be appreciated that if element i does not have all attributes of the specific element, the distance function d for an attribute that is not present for element i may return a value of 0, such that the attribute does not contribute to the probability of the element to be the specific element.

However, not all attributes are equally important, and some attributes may be more important for differentiating between the specific element and other elements.

Thus, each attribute j may be associated with a weight $w_j$ and the probability for each element i may be defined as $$p_i = \left(\sum_{j=1}^{m}(W_j * d(E_iA_j, E_sA_j))\right) * \frac{1}{\sum_{j=1}^{m}W_j}$$

It will be appreciated that each attribute may be associated with a different distance function $d_j$, however, this is omitted for the formula above for simplicity.

For any set of weights, the probability of the specific element is therefore 1, due to the definition of d.

On step 304, a set of weights can be determined, such that the $p_i$ expressions for the various elements of the web page are optimized to provide a maximal difference in the attribute space between the probability of the element having the second highest probability and 1, thus providing the highest possible distance between the two highest probability elements, i.e., the best differentiation of the specific element.

This is illustrated in FIG. 2A, showing the various probabilities over the 0-1 range. $P_e$ is the probability of the specific element which is 1, and $P_{n-1}$ is the probability of the element having the second highest probability. The weights are thus determined to increase threshold_1 between 1 and $P_{n-1}$.

Figure 2B:
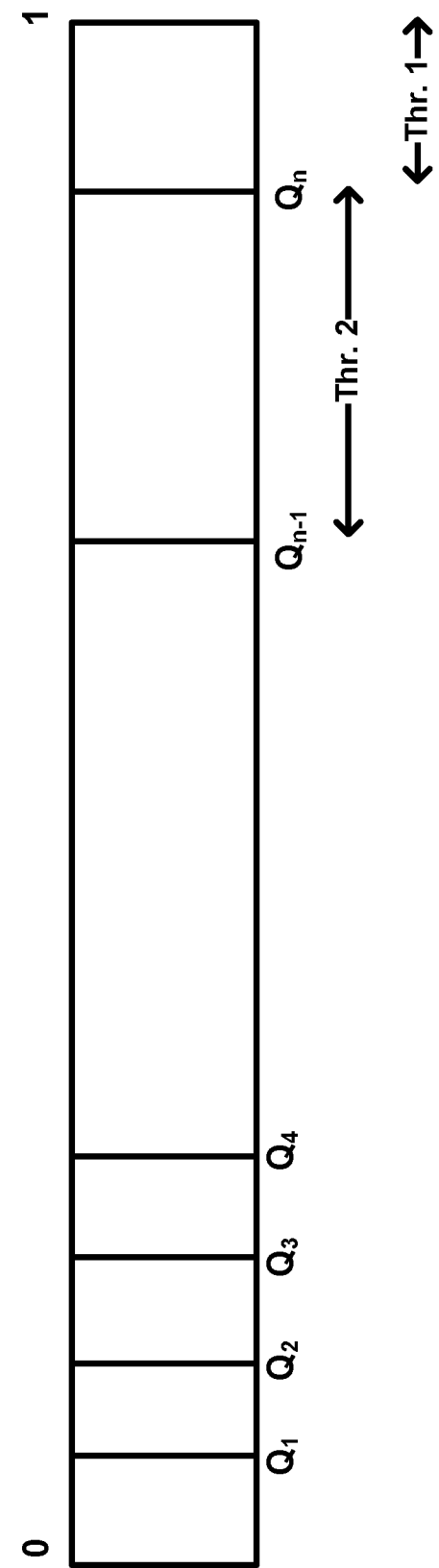
FIG. 2B is an illustration of elements' probabilities during test run time, in accordance with some exemplary embodiments of the disclosed subject matter.
Figure 3B:
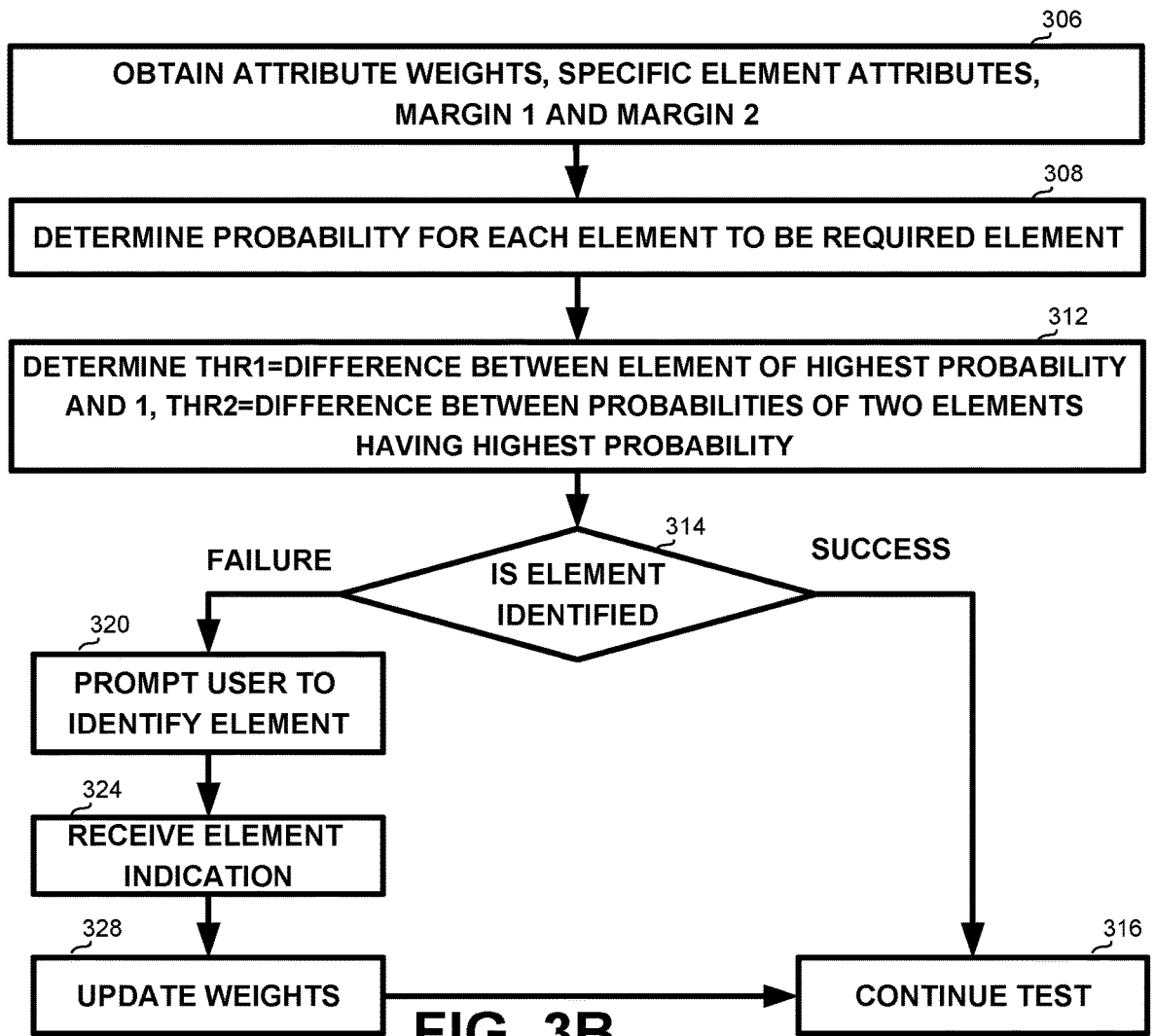
FIG. 3B is a generalized flowchart of a method for performing a web page test, in accordance with some embodiments of the disclosure.

Referring now to FIG. 2B demonstrating elements' probabilities in test execution time, and to FIG. 3B, showing a generalized flowchart of a method for performing a web page test, in accordance with some embodiments of the disclosure.

On step 306, the attribute weights as determined on step 304, the attributes of the specific element as noted during test design, and two margins being margin 1 and margin 2 are received. The attributes can be obtained from a storage device, from a remote storage or processor using a communication channel, or in any other manner. Margin 1 relates to the difference between the probability of the element having the highest probability, and margin 1 relates to the difference between the probabilities of the two elements having the highest probabilities.

On step 308, a probability is determined for each element to be the specific element, using the received attribute weights and the specific element attributes, for example in accordance with the formula:

$$P_i = \left(\sum_{j=1}^{m} w_j d(E_iA_j, BA_j)\right) \times \frac{1}{\sum w_j}$$

On step 312, two thresholds are determined: Threshold 1 being the difference between the probability of the element having the highest probability, and Threshold 2, being the difference between the probabilities of the two elements having the highest probabilities. This is demonstrated in FIG. 2B, showing the probabilities as distributed between 0 and 1, wherein $Q_n$ is the highest probability of any of the elements, $Q_{n-1}$ is the second highest probability, Threshold 1 is $1-Q_n$ and Threshold 2 is $Q_n-Q_{n-1}$.

On step 314 it is determined, based upon the determined thresholds, whether the specific element is identified. The determination is further detailed in association with FIG. 3C below.

If the element was identified successfully, then on step 316 the test may be continued, and actions may be performed upon the identified specific element.

If the element was not successfully identified, which may happen due to no element being identified at sufficiently high probability, or due to possible confusion between two elements having high probabilities due to insufficient difference between the probabilities, then on step 320 a user, such as a testing engineer, may be prompted to identify the specific element. In order to assist the user in resolving the situation, the user may be presented with an indication to the highest probability element, or to the two highest probability elements, and with a corresponding explanation. The user may then point at or otherwise indicate the specific element.

After receiving the specific element, on step 324 the weights may be updated in accordance with the current attributes of the elements, as detailed, for example, in association with step 304 above. However, any other algorithm may be used, including an algorithm that uses the predetermined weights as a starting point and enhances the weights further. Then at step 316 the test may be continued with the received element.

Figure 3C:
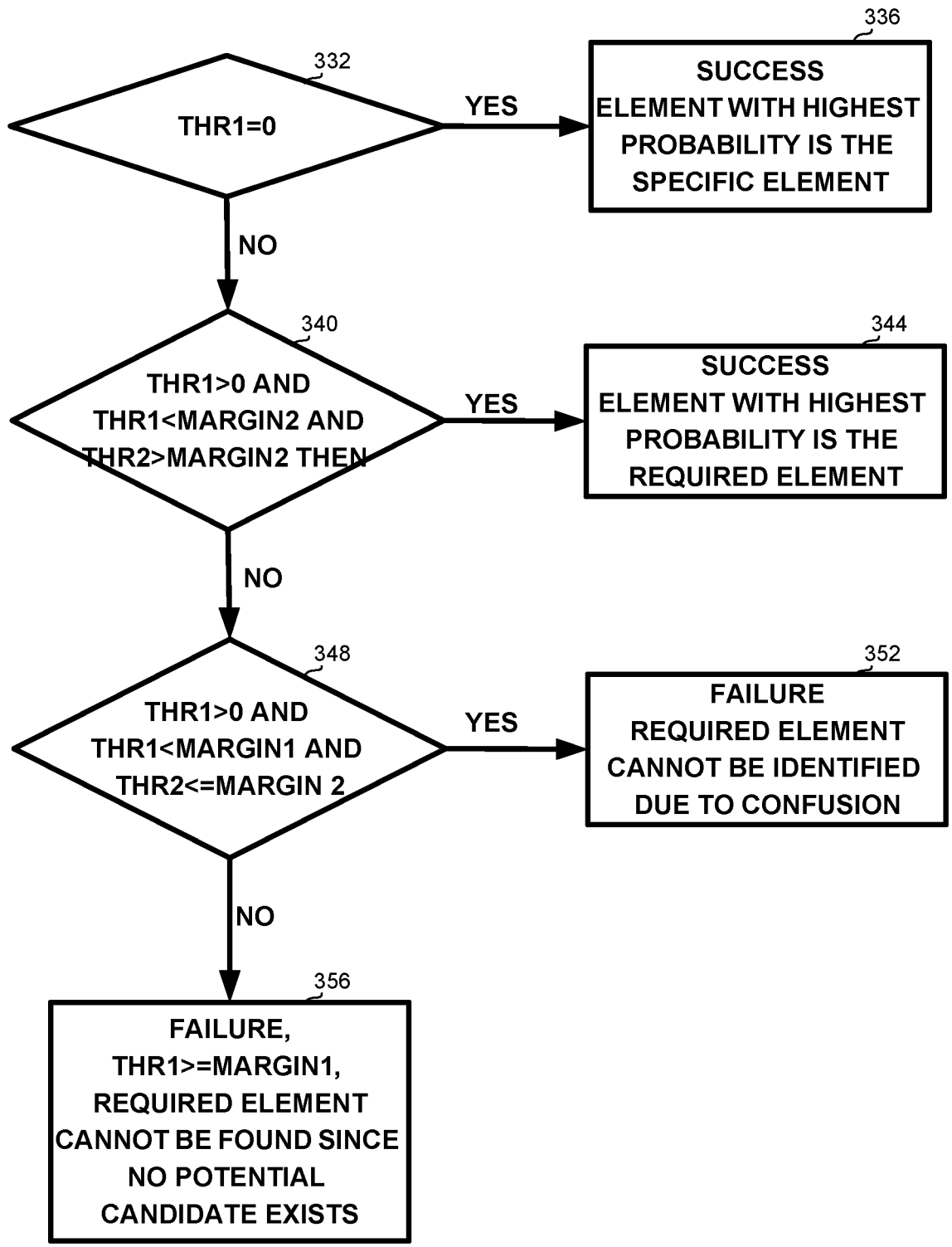
FIG. 3C is a flowchart for determining whether the specific element is identified within the web page and which element it is, in accordance with some embodiments of the disclosure.

Referring now to FIG. 3C, showing a flowchart for determining whether the specific element is identified, in accordance with some embodiments of the disclosure.

On step 332 it may be determined whether Threshold 1 is equal to zero, in which case the probability of a certain element to be the specific element is 1, and the element is identified. Thus, on step 338 success is returned with the highest probability element being the specific element as required.

Otherwise, on step 340 it may be determined whether Threshold 1 is positive, i.e. the attributes of the highest probability element are not identical to those of the specific element, but if Threshold 1 is smaller than margin 1, i.e., the highest probability is close beyond margin 1 to 1, and Threshold 2 is larger than margin 2, i.e. the distance between the probabilities of the two highest probability elements is larger than the margin 2, then it is assumed that the highest probability element is the specific element, and success is returned on step 344, with an indication to the highest probability element as the specific element.

Otherwise, on step 348, it may be determined whether Threshold 1 is positive, i.e. the attributes of the highest probability element are not identical to those of the specific element, but if Threshold 1 is smaller than margin 1, i.e. the highest probability is close beyond margin 1 to 1, and Threshold 2 is smaller than margin 2, i.e. the distance between the probabilities of the two highest probability elements is smaller than the margin 2, then it cannot be resolved which of the two highest probability elements is the required element, thus failure is returned on step 352 due to confusion. The two elements can also be returned, for prompting the user to resolve the confusion on step 320.

Otherwise, Threshold 1 is larger than margin 1, i.e., the highest probability is far beyond margin 1 from 1, and failure is returned, since no potential candidate exists, therefore the required element cannot be identified with a high enough probability.

It will be appreciated that other schemes for determining probabilities may exist. For example, the probability is not necessarily a linear combination of the attribute-wise distances, rather any other distance function can be selected, and relevant weights can be assigned to attributes to enhance the ones that are more effective in differentiating the specific element from all other elements.

Figure 4:
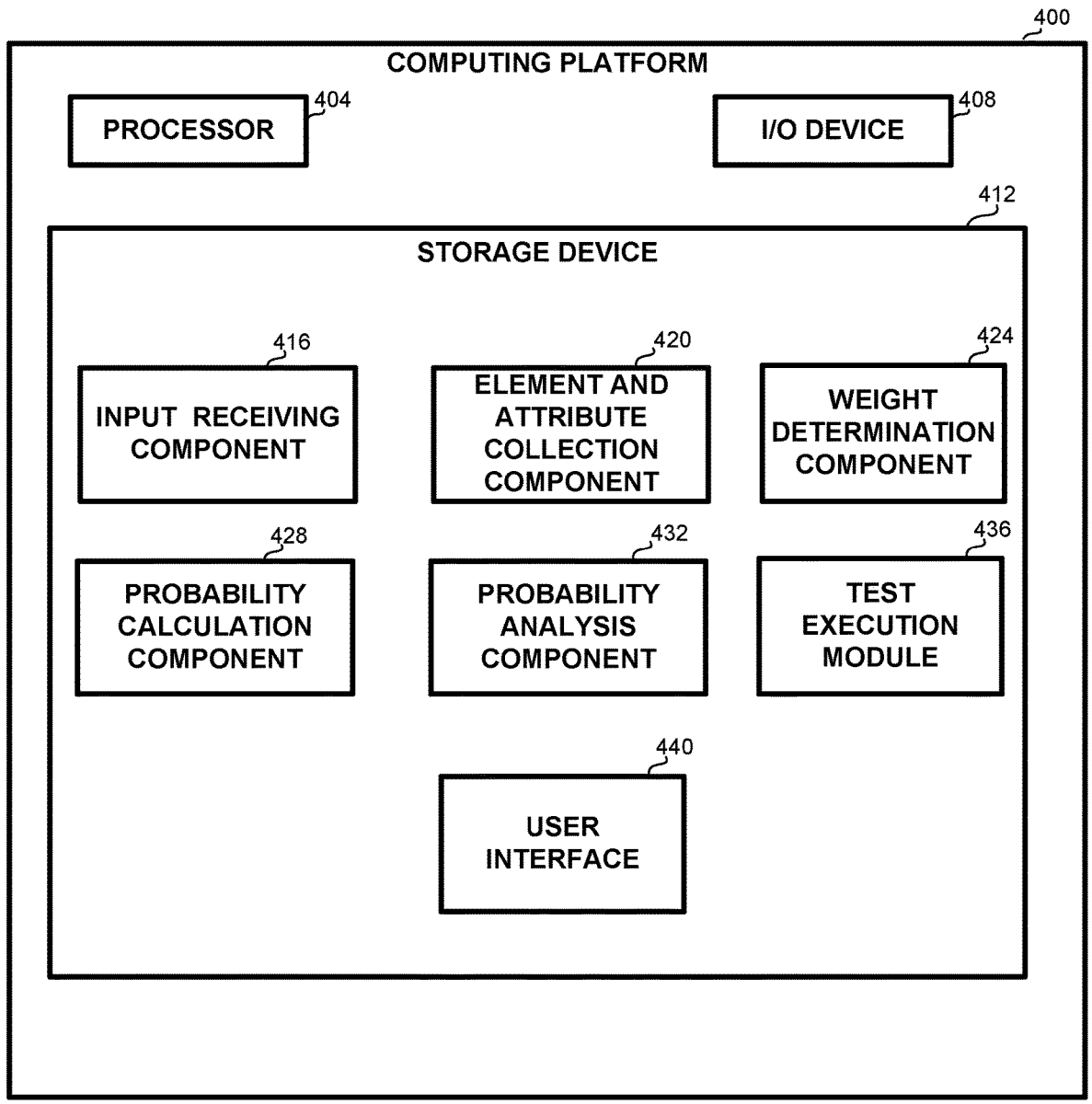
FIG. 4 is a generalized block diagram of a system for web page testing, in accordance with some embodiments of the disclosure.

Referring now to FIG. 4, showing a block diagram of a system for web page testing, in accordance with some embodiments of the disclosure.

The system comprises a computing platform 400, which may comprise one or more processors 404. Any of processors 404 may be a Central Processing Unit (CPU), a microprocessor, an electronic circuit, an Integrated Circuit (IC) or the like. Alternatively, computing platform 400 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 404 may be utilized to perform computations required by computing platform 400 or any of its subcomponents. In some embodiments, computing platform 400 may comprise multiple computing platforms communicating using a communication channel, whether co-located or in multiple locations.

In some embodiments, computing platform 400 may comprise an input-output (I/O) device 408 such as a terminal, a display, a keyboard, an input device or the like to interact with the system, to invoke the system and to receive results, for example a display may be used for prompting the user to point at the specific element and to receive the user's input. It will however be appreciated that the system can operate without human operation and without I/O device 408.

Computing platform 400 may comprise one or more storage devices 412 for storing executable components, and which may also contain data during execution of one or more components. Storage device 412 may be persistent or volatile. For example, storage device 412 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 412 may retain program code operative to cause any of processors 404 to perform acts associated with any of the steps shown in FIGS. 3A-3C above, for example determining weights, identifying the specific element, or the like.

The components detailed below may be implemented as one or more sets of interrelated computer instructions, loaded to storage device 412 and executed for example by any of processors 404 or by another processor. The components may be arranged as one or more executable files, dynamic libraries, static libraries, methods, functions, services, or the like, programmed in any programming language and under any computing environment.

In some embodiments the loaded components may include input receiving component 416 for receiving a web page description, such as in HTML format, the specific element upon which the test should be performed, margin 1 and margin 2 in runtime, and possibly additional input.

Storage device 412 may comprise element and attribute collection component 420, for collecting the elements and attributes from a web page, at test development time for determining the weights, and at test runtime in order to determine the probability of each element to be the specific element.

Storage device 412 may comprise weight determination component 424 for determining at test development time the weights to be associated with the attributes, to best differentiate between the specific element and the other elements of the web page. Weight determination component 424 may also be used at runtime to readjust the weights if the specific element is not identified. Weight determination component 424 may operate as detailed in association with step 304 above.

Storage device 412 may comprise probability calculation component 428 for determining a probability that an element is the specific element, using the weights determined by weight determination component 424, as described in association with step 308 above.

Storage device 412 may comprise probability analysis component 432 for determining based on the probabilities calculated by probability calculation component 428, whether the specific element is identified and which element it is, as described in association with the method of FIG. 3C above.

Storage device 412 may comprise test execution module 436, for attempting to identify the specific element, and upon success, perform one or more actions upon the specific element. It will be appreciated that a test can comprise a multiplicity of sequences, wherein each sequence comprises identifying an element, and performing one or more actions upon the element.

Storage device 412 may comprise user interface 440 for receiving input from the user and providing output to the user, using any one or more I/O devices 408. For example, user interface 440 may display the web page to the user and receive the user's indication for the specific element, display a request to the user to indicate the specific element in runtime if the element is not identified, show the element, display test results, or the like.

The disclosed method and apparatus provide for automatically testing automation software under a variety of configurations with little burden on the test developer. The method and apparatus provide for efficiently repeating texts for different configurations, in a reliable and robust manner which does not depend on the reliability or behavior of the activated programs.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    obtaining attribute weights associated with element attributes in a web page comprising elements, in regard of a specific element to be operated upon, a first margin, and a second margin;
    based on the attribute weights, determining a probability for each element in the web page to be the specific element;
    determining a first threshold indicating a difference between probabilities of two elements having the highest probabilities;
    determining a second threshold indicating a difference between a probability of an element having the highest probability and one;
    based on the first threshold, second threshold, first margin and second margin, determining whether the element having the highest probability is the specific element; and
    subject to the specific element being identified, performing a human interaction simulation upon the specific element.

2. The computer-implemented method of claim 1, further comprising:
    subject to the specific element not being identified:
        prompting a user to identify the specific element; and
        performing the action upon the specific element.

3. The computer-implemented method of claim 2, wherein if the specific element cannot be identified, prompting the user includes indicating the element having the highest probability and an element having the second highest priority.

4. The computer-implemented method of claim 2, wherein if the specific element cannot be found, prompting the user includes indicating the element having the highest probability.

5. The computer-implemented method of claim 2, further comprising updating the attribute weights in accordance with the specific element as identified by the user.

6. The computer-implemented method of claim 1, further comprising determining the attribute weights, comprising:
    obtaining from an HTML description elements of the web page and attributes of the elements;
    determining the attribute weights such that a difference between a probability of the specific element and a probability of an element having the second highest probability is maximal.

7. The computer-implemented method of claim 1, wherein determining whether the element having the highest probability is the specific element comprises:

subject to the second threshold being zero, determining that the specific element is the element having the highest probability;

subject to the second threshold being larger than zero and smaller than the second margin, and the first threshold being larger than the first margin, determining that the specific element is the element having the highest probability;

subject to the second threshold being larger than zero and smaller than the second margin, and the first threshold being smaller or equal to the first margin, determining that the specific element cannot be identified; and subject to the second threshold being larger or equal to the second margin, determining that the specific element cannot be found.

8. A computer-implemented method performed by a computerized device, comprising:

obtaining attribute weights associated with element attributes in a web page, in regard of a specific element to be operated upon;

based on the attribute weights, determining a probability for each element in the web page to be the specific element;

determining whether the element having the highest probability is the specific element;

subject to the specific element being identified, performing a human interaction simulation upon the specific element; and subject to the specific element not being identified:
prompting a user to identify the specific element;
receiving an indication to the specific element from the user; and
performing the action human interaction simulation upon the specific element.

9. The computer-implemented method of claim 8, wherein if the specific element cannot be identified, prompting the user includes indicating the element having the highest probability and an element having the second highest priority.

10. The computer-implemented method of claim 8, wherein if the specific element cannot be found, prompting the user includes indicating the element having the highest probability.

11. The computer-implemented method of claim 8, further comprising updating the attribute weights in accordance with the specific element as identified by the user.

12. A computerized apparatus having a processor, the processor being adapted to perform the steps of:

obtaining attribute weights associated with element attributes in a web page, in regard of a specific element to be operated upon, a first margin, and a second margin;

based on the attribute weights, determining a probability for each element in the web page to be the specific element;

determining a first threshold indicating a difference between probabilities of two elements having the highest probabilities;

determining a second threshold indicating a difference between a probability of an element having the highest probability and one;

based on the first threshold, second threshold, first margin and second margin, determining whether the element having the highest probability is the specific element; and subject to the specific element being identified, performing a human interaction simulation upon the specific element.

13. The apparatus of claim 12, wherein the processor is further configured to:

subject to the specific element not being identified:
prompt a user to identify the specific element; and
perform the action upon the specific element.

14. The apparatus of claim 13, wherein prompting the user includes indicating the element having the highest probability and an element having the second highest priority.

15. The apparatus of claim 13, wherein prompting the user includes indicating the element having the highest probability.

16. The apparatus of claim 13, wherein subject to the specific element not being identified, the processor is further configured to update the attribute weights in accordance with the specific element as identified by the user.

17. The apparatus of claim 12, wherein the processor is further configured to determine the attribute weights, comprising:

obtaining from an HTML description elements of the web page and attributes of the elements;

determining the attribute weights such that a difference between a probability of the specific element and a probability of an element having the second highest probability is maximal.

18. The apparatus of claim 12, wherein determining whether the element having the highest probability is the specific element comprises:

subject to the second threshold being zero, determining that the specific element is the element having the highest probability;

subject to the second threshold being larger than zero and smaller than the second margin, and the first threshold being larger than the first margin, determining that the specific element is the element having the highest probability;

subject to the second threshold being larger than zero and smaller than the second margin, and the first threshold being smaller or equal to the first margin, determining that the specific element cannot be identified; and subject to the second threshold being larger or equal to the second margin, determining that the specific element cannot be found.

* * * * *